United States Patent
Ghosh et al.

(10) Patent No.: US 6,741,265 B2
(45) Date of Patent: May 25, 2004

(54) NETWORK-BASED DESIGN SYSTEMS AND METHODS

(75) Inventors: Asish Ghosh, Slingerlands, NY (US); John Arley Avery, Pittsfield, MA (US); Scott Thomas Wheeler, Dalton, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/449,431

(22) Filed: Nov. 24, 1999

(65) Prior Publication Data

US 2003/0085921 A1 May 8, 2003

(51) Int. Cl.$^7$ .................................................. G06F 3/00
(52) U.S. Cl. ..................... 345/751; 345/733; 345/771; 345/964; 345/970; 700/95; 709/205
(58) Field of Search .................................. 345/733, 738, 345/751, 753, 755, 759, 764, 771, 835, 846, 964, 970; 700/83, 86, 95–97, 103, 106, 107; 709/204, 205; 705/28, 29

(56) References Cited

U.S. PATENT DOCUMENTS

| | | | | |
|---|---|---|---|---|
| 5,206,934 A | * | 4/1993 | Naef, III | 709/204 |
| 5,282,127 A | | 1/1994 | Mii | 700/1 |
| 5,539,886 A | * | 7/1996 | Aldred et al. | 345/753 X |
| 5,655,110 A | * | 8/1997 | Krivokapic et al. | 716/19 |
| 5,687,094 A | * | 11/1997 | Kagawa et al. | 716/5 |
| 5,822,206 A | * | 10/1998 | Sebastian et al. | 700/97 |
| 6,008,804 A | * | 12/1999 | Pommier et al. | 345/753 |
| 6,115,641 A | * | 9/2000 | Brown et al. | 700/102 |
| 6,116,766 A | * | 9/2000 | Maseeh et al. | 700/97 |
| 6,158,903 A | * | 12/2000 | Schaeffer et al. | 709/204 |
| 6,249,714 B1 | * | 6/2001 | Hocaoglu et al. | 700/97 |
| 6,253,115 B1 | * | 6/2001 | Martin et al. | 700/97 |
| 6,295,513 B1 | * | 9/2001 | Thackston | 703/1 |
| 6,473,720 B1 | * | 10/2002 | Hampson | 702/182 |

OTHER PUBLICATIONS

Shaun P. Mulligan et al, "IBM Austin Electronic Card Assembly and Test si sigma process modeling strategy", Sep. 1991, IEEE, pp. 102–104.*

(List continued on next page.)

Primary Examiner—John Cabeca
Assistant Examiner—X. L. Bautista
(74) Attorney, Agent, or Firm—Cantor Colburn LLP

(57) ABSTRACT

A network based product design system and method allows product design. The system comprises a central processing unit capable of product design; at least one communication link allows selective two-way communication to the central processing means; and a network selectively interconnects and communicates the central processing unit to at least one party through the at least one communication link. Each party that is connected to the central processing unit is capable of providing input regarding a product design, the network being capable of allowing the input to be simultaneously viewed by each party so that input made by one party is capable of being accessed by at least one other party. The method for designing a product over a network comprises displaying a model on a central processing unit, the model being representative of the product that is to be designed; permitting two-way communication to the central processing unit over communication links; and selectively interconnecting and communicating the product design through the central processing unit to at least one party over the at least one communication links.

46 Claims, 1 Drawing Sheet

OTHER PUBLICATIONS

L. F. Fuller et al, "Improving Manufacturing Performance at the Rochester Institute of Technology Integrated Circuit Factory", Nov. 1995, IEEE, pp. 350–355.*

Joseph Bianco, "Virtual Collaborative Simulation Environment for Integrated Product and Process Development", 1996, IEEE, pp. 19–22.*

L. Bisone et al, "A CAD multiprocessor system for advanced real–time process applications", 1995, IEEE, pp. 494–501.*

Brady R. Davies et al, "System Composer: Technology for Rapid System Integration and Remote Collaboration", 1996, IEEE, pp. 2377–2382.*

* cited by examiner

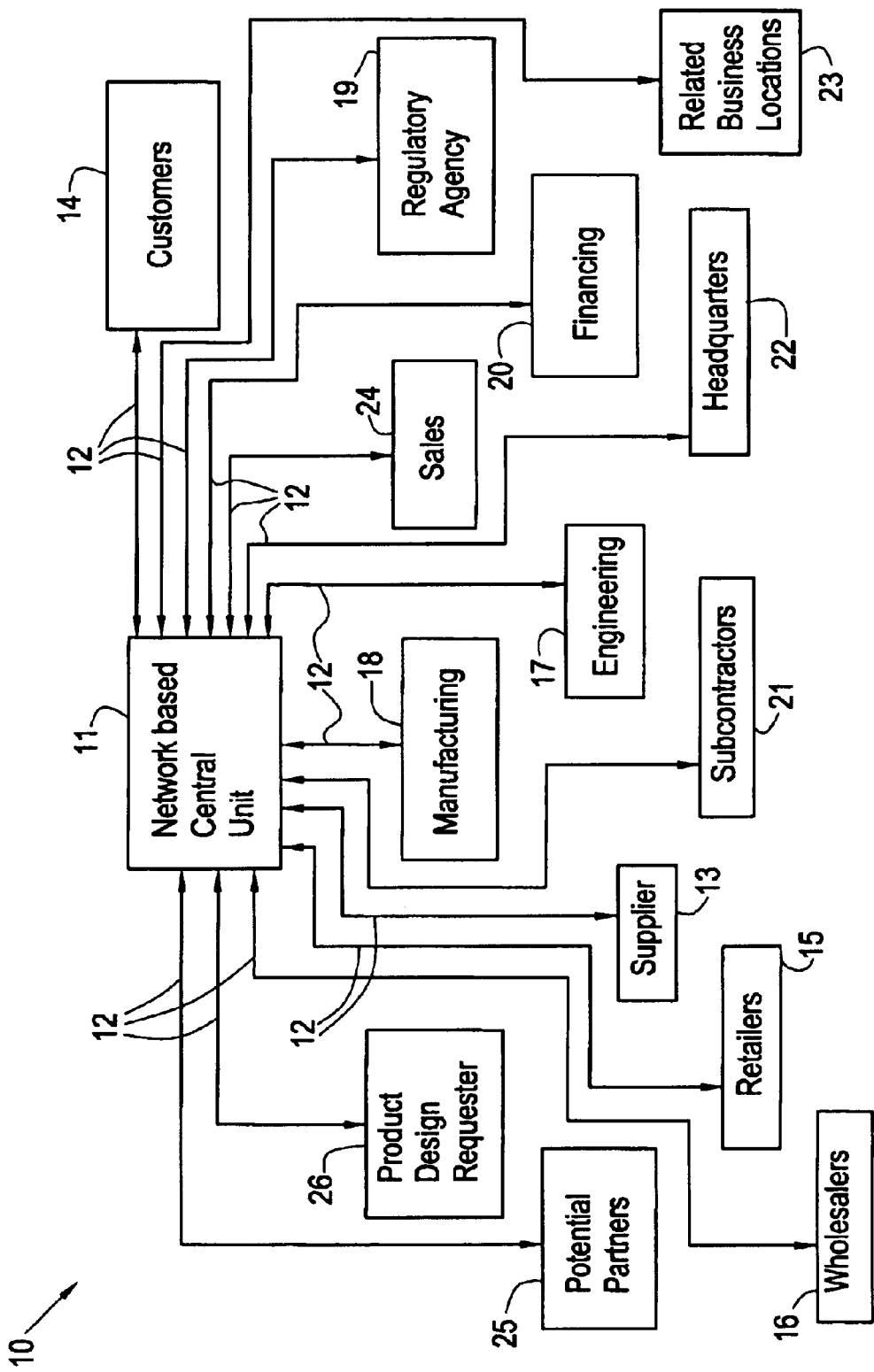

NETWORK-BASED DESIGN SYSTEMS AND METHODS

BACKGROUND OF THE INVENTION

The invention relates network-based design systems and methods for designing products. In particular, the invention relates to network-based design systems and methods that connect various parties to enhance tooling operations.

Currently product design and development is a timely, costly, and complex endeavor. The high costs and long times can be caused by delays in communicating information regarding on product design and product design changes to, from, and between concerned parties. Also, the high costs and long times can be caused by a lack of concurrent product design access. For example, if one party provides input, for example, makes a change in product development, it may take a lengthy amount of time for the information concerning the changes to get communicated to all involved parties. If the information concerning the changes does not get to the appropriate parties, and product design and development continue without the information concerning the changes, unnecessary changes will be needed. Further, if the information concerning the changes requires regulatory approval, for example government approval, delays in communicating the information concerning changes may cause delays in approval of the product.

For example, the information concerning the design changes may be communicated by letter, US Mail Service, telegram, telegraph, interoffice mail, courier, or other such means, all of which may cause time delays in all parties receiving the information concerning the changes. If one party gets the information concerning the changes, reviews it, and modifies it in some manner, that party will have to communicate that to all of the parties. This communication of changes to the design information concerning the changes will again take time. Also, others reviewing the first design information concerning the changes may also want to or need to make modifications, and will attempt to communicate such change information. The communication of modifications to the information concerning the changes can multiply upon itself and depending on how, when, and why one party gets the information concerning the changes or modifications to the information concerning the changes, there may be severe confusion. In most events, extensive interpreting and work will be involved with any information concerning the changes. Also, some, and often extensive re-tooling and rework of the product will result.

Previously, sequential processes were used to communicate and implement changes in product designs. The sequential processes clearly led to time delays, which are of course undesirable. Parallel processes have been and are being used to communicate and implement changes in product designs. While such parallel processes are an improvement over the sequential processes, there may still be problems associated communication of the design changes, and further problems communicating a party's input or modifications to the proposed design changes.

Attempts to resolve problems associated with communication of information concerning the design changes have been proposed through teleconferences, in-face meetings, video-conferencing, and like meeting solutions. These proposed solutions, while somewhat effective, may not allow each party to review the information concerning the changes to the extent necessary. For example, typically it is not possible to have all engineers, scientist, and other interested personnel of one party, not to mention all of the parties, involved with a product's development to attend a meeting, whether it is an in-face meeting or even a teleconference. Also, much of the information concerning the design changes requires time to study the proposed changes and evaluate them, including time to make validations, studies, and other calculations concerning the proposed the changes. Thus, the information concerning the changes is not provided to all parties in real time or near real time.

Also, the information concerning proposed design changes may not be sufficiently reviewed, and the information concerning the design changes may have to be again changed at a later time, which of course is undesirable. Therefore, this product design communication attempts result in time delays, increased costs, disconnects between parties, and poor communications of changes and ideas.

It has been proposed to electronically communicate design changes to parties, however, these attempts have not been able to connect all parties together in real time, or near real time circumstances. Thus, time delays are inevitable, and the above-discussed problems may arise.

Accordingly, a need exists for systems and method that allow communication of information product design changes to be communicated between parties, and allow interaction and input from each party without significant time delays. Further, a need exists for systems and methods that allow product design communication between of parties, for example on a real time or near real time basis.

SUMMARY OF THE INVENTION

Accordingly, a network based product design system and method allows product design. The system comprises a central processing unit for product design; at least one communication link that allows selective two-way communication to the central processing unit; and a network that selectively interconnects and communicates the central processing unit to at least one party through the at least one communication link. Each party that is connected to the central processing unit is capable of providing input regarding a product design, and the network is capable of allowing the input to be simultaneously viewed by each party so that input made by one party is capable of being accessed by at least one other party.

In another aspect of the invention, a method for designing a product over a network comprises displaying a model on a central processing unit, the model being representative of the product that is to be designed; permitting two-way communication to the central processing unit over communication links; and selectively interconnecting and communicating the product design through the central processing unit over the at least one communication link. Each party that is connected to the central processing unit is capable of providing input regarding a product design, the network being capable of allowing the input to be simultaneously viewed by each party so that input made by one party is capable of being accessed by at least one other party.

A further aspect of the invention sets forth a network based product design system for allowing product design. This system comprises a central processing unit for product design, the central processing unit comprises at least one of transfer functions and quality-related, analytical tools to analyze and evaluate the product design; at least one communication link that allows selective two-way communication to the central processing unit in at least near real time, wherein the at least one communication link comprises at least one of phone modem, network connection, communication, radio communication and other wireless communication systems, cellular communication, satellite communication, web access communication, and Internet access communication, and combinations thereof; and a network that selectively interconnects and communicates the central processing unit to at least one party through the at least one communication link. Each party that is connected to the central processing unit is capable of providing input regarding a product design, and the network is capable of allowing the input to be simultaneously viewed by each party so that input made by one party is capable of being accessed by at least one other party, the central processing unit comprises at least one of graphic user interface, computer-aided design tools, and computer-aided manufacturing tools, wherein each party may make input to the product design using at least one of the graphic user interface computer-aided design tools, and computer-aided manufacturing tools.

Yet another aspect of the invention sets forth a method for designing a product over a network. The method is capable of allowing product design and comprises displaying a model on a central processing unit, the model being representative of the product that is to be designed; permitting two-way communication to the central processing unit over communication links in at least near real time, wherein the at least one communication link comprises at least one of phone modem, network connection, communication, radio communication and other wireless communication systems, cellular communication, satellite communication, web access communication, and Internet access communication, and combinations thereof; selectively interconnecting and communicating the product design through the central processing unit to at least one party over the at least one communication link; allowing the input to be simultaneously viewed so that input made by one party is capable of being accessed by at least one other party; and analyzing and evaluating the product design using at least one of transfer functions and quality-related, analytical tools. Each party that is connected to the central processing unit is capable of providing input regarding a product design. The network is capable of allowing input to be simultaneously viewed by each party, so that input made by one party is capable of being accessed by at least one other party. The central processing unit comprises at least one of graphic user interface, computer-aided design tools, and computer-aided manufacturing tools, wherein each party may make input to the product design using at least one of the graphic user interface computer-aided design tools, and computer-aided manufacturing tools to assist in the designing of the product.

Further, an aspect of the invention also sets forth a network based product design system. The system comprises central processing means for product design; communication link means that allows selective two-way communication to the central processing unit means; and network means that selectively interconnects and communicates the central processing unit means to at least one party through the communication link means. Each party that is connected to the central processing unit means is capable of providing input regarding a product design, and the network is capable of allowing the input to be simultaneously viewed by each party so that input made by one party is capable of being accessed by at least one other party.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIG. 1 is a block diagram of a network-based design system, as embodied by the invention.

DESCRIPTION OF THE INVENTION

The network-based design methods and systems, as embodied by the invention, provide communication between parties involved in product design, development, and product modification. The description of the network-based design methods and systems will refer to product design, however, this description is not intended to limit the invention in any manner. Other types of manufacture, modification, redesign, and other product development is within the scope of the invention.

The network-based product design methods and systems, and the network-based designing through tool cutting and manufacturing (hereinafter "network-based design system") comprises a central unit, such as but not limited to a server. The central unit is capable of providing communication between all parties that are, or could be, involved with product design. The parties may be interdispersed along a product's chain of supply, such as manufacturing, suppliers, and sub-contractors. Alternatively, the network-based design system can provide communication between different levels of parties in the product design. These parties may include, but are not limited to, suppliers, customers, retailers, wholesalers, engineering, manufacturing, sales, regulatory agencies, financiers, sub-contractors, management and headquarters, other manufacturing or business sites (hereinafter collectively referred to as "parties" and each entity as "party"). Thus, the network-based design system can reduce cycle times and associated costs involved with product design.

The network-based design system is capable of providing communication between the parties in real time or near real time basis over appropriate communications links. The communications links hereinafter, include, but are not limited to, at least one of a phone modem, network connection, communication, radio communication and other wireless communication systems, cellular communication, satellite communication, web access communication, and Internet access communication, and combinations thereof. The communications links allow selective two-way communication between each party. Thus, each party may be able to interface with each other and communicate ideas, modifications, and thoughts on product design with other parties, as it desires, that is connected to the network-based design system. The term "selective two-way communication" means that a party may instruct the central unit to allow communication to and from all parties, or to and from one or more individual parties, as it chooses. Therefore, if upon reviewing product design, one party has input, such as but not limited to comments on proposed materials for the product's design, this input can be communicated to the parties, without the time delays, increased costs, disconnects, and poor communications associated with prior communications of product design changes. The terms "real time" and "near real time" mean that any delays from the time the process variable information is monitored, evaluated and analyzed, and then available to the machine operator is minimal, for example on the order of minutes, and possibly a few seconds, if any delay is present. The term "capable" as used in this application means that the associated feature can, if properly used, accomplish, permit, or provide the disclosed property or function.

The network-based design system also provides a capability to communicate between parties information concerning the design and manufacture tools and molds for manufacturing processes and systems. For example, and in no way limiting of the invention, the network-based design system provides a capability to communicate information concerning design and manufacture tools and molds for plastic manufacturing processes and systems, such as designing and manufacturing molds for extruders, injection-molding machines, and similar plastic related processes and systems. The capability to communicate information concerning design and manufacture tools and molds includes, but is not limited to information concerning tool and mold design and manufacture by processes such as, but not limited to, machining, electro-discharge machining (EDM), welding and other such processes.

Further, the network-based design system also provides a capability for parties to provide comments concerning the tool and mold design information. Each party may be able to provide comments and feedback about the information over the network-based design system in a real or near-real time basis, so that information is quickly and readily available for analysis and evaluation. The analysis and evaluation can be performed by any respective party, by the network-based design system, or by both any respective party and network-based design system.

The analysis and evaluation, as embodied by the invention, comprises but is not limited to, mold formation, mold filling and mold cooling analysis and evaluation, if the network-based design system is used for design of molds and related process and manufacturing systems. For example, the mold formation feature of the network-based design system may include analysis and evaluation of possible manufacturing, cutting, tooling, and other related manufacturing processes that can be used to create a mold under the network-based design system, as embodied by the invention. Transfer of the mold design can be performed by any appropriate process, such as but not limited to, from a computer-aided design in the network-based design system to an associated computer-numerical control (CNC). This transfer may enable the network-based design system to provide cutting paths or steps for mold design and manufacture, for example, manufacture by EDM processes.

The network-based design system may also include the ability to evaluate and analysis mold filing and cooling, for example using computer-related steps, processes, analogies, and transfer functions, in which the transfer functions can be originally provided in the network-based design system, created by the network-based design system, modified by the h network-based design system, or combinations thereof. Accordingly, the network-based design system can provide filing and cooling information, either analyzed and evaluated using tools provided by the network-based design system, or "raw" information to authorized parties, as discussed herein.

The network-based design system provides a value-added service to each party. The network-based design system is essentially transparent to each party and enables concurrent transfer of product design information to all parties. The network-based design system is capable of scheduling production, placing orders, and billing based on input. For example, if a customer desires a product having certain design criteria, the customer merely enters a product request information with the desired criteria in to the network-based design system. Various manufacturers and/or suppliers can access the entered product request information, evaluate the entered product request information. The manufacturers and suppliers may also ask questions concerning the requested product design, for example ask questions concerning the products intended usage, material specifications, colors, or other such product design particulars. Also, engineers, manufacturing, sales, and other components of the manufacturer and supplier may provide input on the requested product design. Thereafter, bids may be provided on the entered product design.

The requester of the product design can then evaluate the bids from the manufacturers and/or suppliers. The requester of the product design may then select the bid that best meets its needs. Alternatively, the requester may be able to counter one or more of the bids. Thus, the network-based design system provides at least a two or more way communication between parties so as to arrive at an acceptable product design and product, which are acceptable to all parties. The network-based design system can not only reduce operational and manufacturing costs, but it may also reduce cycle times for product development, due at least in part to the real time aspects of the network-based design system. The network-based design system may also reduce times from order to remittance, again due at least in part to the real time aspects of the network-based design system.

The network-based design system may also be is capable of providing sensing and alarm functions that can send alerts if the network-based design system detects problems or potential problems with the product design, or even the network-based design system itself. The sensing functions can comprise evaluation and analysis tools, or alternatively can develop such evaluation and sensing tools, that detect at least one of possible problems or potential problems with the product design, a defect in the product design, or a failure in the network-based design system. The alert function of the network-based design system may act to alert parties connected by the network-based design system of the potential to the problem.

The network-based design system will be explained with reference to FIG. 1. FIG. 1 is a schematic block diagram of the network-based design system 10, as embodied by the invention. The network-based design system 10 comprises a network-based central processing unit 11 (hereinafter "central unit") and one or more parties. As illustrated, the parties include but are not limited to, suppliers 13, customers 14, retailers 15, wholesalers 16, engineering 17, manufacturing 18, regulatory agencies 19, financiers 20, sub-contractors 21, management and headquarters 22, other manufacturing or business sites 23, sales 24, potential partners 25, and the product design requester 26. Each party is connected to the central unit 11 by a communications link 12, as discussed above.

The central unit 11, through the communications links 12, allows the selective two-way communications between parties in the network-based design system 10. Each party may designate with what particular parties to communicate product design information, and may be able to block other parties from accessing its information. For example, one supplier may not want other suppliers to know what prices and conditions upon which it may offer services or products, so it may make its communications regarding the product design available to only select parties. This selective communication may be accomplished through various methods, such as but not limited to, password protection, encryption, codes, e-mail that is distinct and separate from the network-based product design system and other such protected communication means. The central unit 11, by means of its selective two-way communications ensures security of communications between parties.

The central unit 11 also comprises means, such as software, to generate a web site. The web site can be uniquely generated to provide data, figures, information, characteristics, and particulars concerning the product design. For example, if the product design is for glass containers for a particular liquid, a product model glass container will be displayed on the web site. A product model will be available for all authorized parties to view and provide comments about and alter the product model, if desired. The product model may comprise at least one of a picture of the product, either in 2- or 3-dimensions, basic characteristics of the product, desired characteristics of the product, design criteria, specifications, minimum required properties, and combinations thereof.

The central unit 11 may also be able to access base data on some aspects of the product design, and also place that on the web site. For example, the web site may provide a density and various properties and characteristics of the liquid. The web site may also provide links to other information concerning the product design, such as Internet links with pertinent information, background information, usage information, regulatory information, and toner information that may have information useful to a party.

In use, a product design requester accesses the network-based design system 10, and places a product design request thereon. The product design requester may authorize parties to have access to the product design request. Thereafter, parties may access the web site to provide design input, such as but not limited to comments and information, concerning the product design. The parties may be able to access the product design web site in unison. Thus, when one party provides some information or has a question regarding the product design, others may be able to answer it in real time, rather than wait for other forms of communication to relay the questions.

The central unit 11 may also comprise appropriate means to permit at least one of computer-aided engineering (CAE), computer-aided manufacture (CAM) and computer-aided design tools (CAD) software, which can be provided in the central unit 11, or alternatively at a location accessible by the central unit 11, to generate the model in response to the requested product design. For example, at least one of CAM, CAE, and CAD may generate the model so that authorized parties may view the model in many different modes and angles, as permitted by the CAM, CAE, and CAD. Further, the CAM, CAE, and CAD may permit changes to be made in real time to the model that is displayed on the web site by the central unit 11, so hat all authorized parties may look at the changes and comment thereon. The CAD, CAE, and CAM may also permit mark-ups on the model and web site, for example by appropriate graphic user interface (GUI) tools. The mark-ups allow input, comments, and modifications to be made directly to the illustrated model and seen by authorized users for input.

The central unit 11 may also include archival systems to provide a listing of all parties who have accessed and/or commented on the product design. Further, the central unit may provide archival data information, such has chronological access information regarding when a party has accessed the product design, what comments each party has made, and an ability to go back and see previous product designs. Such archival information allows parties to solicit comments from other parties who have not accessed the product design, or to get input on previous product designs.

The central unit 11 can develop transfer functions to analyze and evaluate the product design, input, comments, and modifications made with regard to the product design. The transfer functions that are developed include, but are not limited to, operational and manufacturing transfer functions. The transfer functions typically are regression analysis operations that model product design based on production and other product design related factors. The transfer functions enable the network-based design system 10 to evaluate and analyze product design to benefit from the network-based communications.

The central unit 11 of the network-based design system may provide the capability to communicate between parties information concerning the design and manufacture tools and molds for manufacturing processes and systems. For example, and in no way limiting of the invention, the central unit 11 of the network-based design system can provide communication capability for information concerning design and manufacture tools and molds for plastic manufacturing processes and systems, such as designing and manufacturing molds for extruders, injection-molding machines, and similar plastic related processes and systems. The capability to communicate information concerning design and manufacture tools and molds by central unit 11 includes, but is not limited to information concerning tool and mold design and manufacture by processes such as, but not limited to, machining, electro-discharge machining (EDM), welding and other such processes.

Further, the central unit 11 of the network-based design system may also provide a capability for parties to provide comments concerning the tool and mold design information. Each party may be able to provide comments and feedback about the information over the network-based design system in a real or near-real time basis, so that information is quickly and readily available for analysis and evaluation. The analysis and evaluation can be performed by any respective party, by the central unit 11 of the network-based design system, or by both any respective party and network-based design system.

The analysis and evaluation, as embodied by the invention, comprises but is not limited to, mold formation, mold filling and mold cooling analysis and evaluation, if the network-based design system is used for design of molds and related process and manufacturing systems. For example, the mold formation feature of the central unit 11 of the network-based design system may include analysis and evaluation of possible manufacturing, cutting, tooling, and other related manufacturing processes that can be used to create a mold under the network-based design system, as embodied by the invention. Transfer of the mold design can be performed by any appropriate process, such as but not limited to, from a computer-aided design in the network-based design system to an associated computer-numerical control (CNC). This transfer may enable the network-based design system to provide cutting paths or steps for mold design and manufacture, for example, manufacture by EDM processes.

The central unit 11 of the network-based design system may also include the ability to evaluate and analysis mold filing and cooling, for example using computer-related steps, processes, analogies, and transfer functions, in which the transfer functions can be originally provided in the network-based design system, created by the network-based design system, modified by the network-based design system, or combinations thereof. Accordingly, the central unit 11 of the network-based design system can provide filing and cooling information, either analyzed and evaluated using tools provided by the network-based design system, or "raw" information to authorized parties, as discussed herein.

A further benefit of the network-based design system arises from at least one the central unit 11 applying quality-related, analytical tools to the product design information. These quality-related, analytical tools include tools that develop the above-described transfer functions to evaluate and analyze product design and a party's information through statistical analysis, design-of-experiments (DOE) methodology, and quality control tools. The applied statistical analysis determines process capability, possible process errors, and network-based design system effectiveness. The applied statistical analysis relies upon known information measurement and analysis procedures, tools, equations, and methodology, such as, but not limited to, those described in *Six Sigma Productivity Analysis and Process Characterization*, Mikel J. Harry and J. Ronald Lawson, Addison-Wesley Publishing Co., 1992.

The network-based design system 10 can implement a design for six sigma (DFSS) process, for example using a transfer function developed by the central unit. Using a DFSS process, the network-based design system 10 and its operation are examined and the number of designated "defects" is attempted to be reduced where a "defect" typically relates to a component of the process that, while not faulty, can be improved. In a DFSS process, a "sigma" value is a metric that indicates how well that process is performing. A higher sigma value relates to an enhanced output. Quality related operations and transfer functions determine a sigma for the process. The process' sigma measures the capability of the process to perform defect-free work. With a DFSS process, a common measurement index is defects-per-unit, where a unit is any item that is capable of being quantified. The sigma value, which is determined by the developed transfer functions, indicates how often defects are likely to occur. As sigma increases, the number of defects is reduced and quality of the process increases, along with improvement of other metrics, such as but not limited to, cost and cycle time.

While various embodiments are described herein, it will be appreciated from the specification that various combinations of elements, variations or improvements therein may be made by those skilled in the art, and are within the scope of the invention.

What we claim is:

1. A network based product design system for product design, the system comprising:
    a network-based central processing unit capable of product design, the central processing unit comprising:
        an analytical tool to analyze and evaluate the effectiveness of the network based product design system including a design for six sigma process; and
        an order placement tool to enter a request for a product including design criteria for the product, to receive bids for the product from a supplier or a manufacturer, to place an order for the product with said supplier or said manufacturer, and to schedule production of the product;
    at least one communication link that allows selective two-way communication to the central processing unit; and
    a network that selectively interconnects and communicates the central processing unit to at least one party through the at least one communication link,
    wherein each party that is connected to the central processing unit is capable of providing input regarding the product design, the network being capable of allowing the input to be simultaneously viewed by each party as the input is being made so that input made by one party is capable of being accessed by at least one other party, and wherein each party that is connected to the central processing unit selectively blocks particular parties from accessing the input regarding the product design.

2. A system according to claim 1, wherein the network selectively interconnects and communicates the central processing unit to at least one party in real time.

3. A system according to claim 1, wherein the network selectively interconnects and communicates the central processing unit to at least one party in near real time.

4. A system according to claim 1, wherein the at least one communication link comprises the Internet.

5. A system according to claim 1, wherein the at least one communication link comprises at least one of phone modem, network connection, radio communication and other wireless communication systems, cellular communication, satellite communication, web access communication, and Internet access communication, and combinations thereof.

6. A system according to claim 1, wherein the central processing unit further comprises computer-aided design tools capable of product design, wherein each party may make input to the product design using the computer-aided design tools.

7. A system according to claim 1, wherein the central processing unit further comprises computer-aided manufacturing tools capable of product design, wherein each party may make input to the product design using the computer-aided manufacturing tools.

8. A system according to claim 1, wherein the central processing unit further comprises computer-aided engineering tools capable of product design, wherein each party may make input to the product design using the computer-aided engineering tools.

9. A system according to claim 1, wherein the central processing unit further comprises at least one of computer-aided design tools, computer-aided engineering tools, and computer-aided manufacturing tools capable of product design, wherein each party may make input to the product design using at least one of the computer-aided design tools, computer-aided engineering tools, and computer-aided manufacturing tools.

10. A system according to claim 1, wherein the central processing unit further comprises graphic user interface capable of product design, wherein each party may make input to the product design using the graphic user interface.

11. A system according to claim 1, wherein the central processing unit archives the input by each party, wherein each party may access archived input.

12. A system according to claim 1, wherein the central processing unit further comprises transfer functions to analyze and evaluate the input with regard to the product design.

13. A system according to claim 1, wherein the central processing unit further comprises quality-related analysis tools to analyze and evaluate the product design.

14. A system according to claim 1, wherein the central processing unit communicates information concerning design and manufacture of tools and molds.

15. A system according to claim 1, wherein the central processing unit communicates information concerning design and manufacture of tools and molds for plastic-formation processes.

16. A system according to claim 15, wherein the central processing unit communicates information concerning design and manufacture of tools and molds for plastic-formation processes comprises tool and mold design and manufacture by at least one of machining, electro-discharge machining, and welding.

17. A system according to claim 1, wherein the central processing unit communicates information concerning design and manufacture of tools and molds, and the central processing unit provides evaluation and analysis of mold filing and mold cooling.

18. A system according to claim 17, wherein the central processing unit provides evaluation and analysis of mold filing and mold cooling using computer-related steps, processes, analogies, and transfer functions, and the transfer functions comprises transfer functions that are at least one of originally provided in the network-based design system, created by the network-based design system, modified by the network-based design system, or combinations thereof.

19. A network based product design system for product design, the system comprising:
- a central processing unit that is capable of product design, the central processing unit comprises:
  - an analytical tool to analyze and evaluate the effectiveness of the network based product design system including a design for six sigma process;
  - an order placement tool to enter a request for a product including design criteria for the product, to receive bids for the product from a supplier or a manufacturer, to place an order for the product with said supplier or said manufacturer, and to schedule production of the product; and
  - at least one of transfer functions and quality-related analysis tools to analyze and evaluate the product design;
- at least one communication link that allows selective two-way communication to the central processing unit in at least near real time, wherein the at least one communication link comprises at least one of phone modem, network connection, radio communication and other wireless communication systems, cellular communication, satellite communication, web access communication, and Internet access communication, and combinations thereof; and
- a network that selectively interconnects and communicates the central processing unit to at least one party through the at least one communication link, wherein each party that is connected to the central processing unit is capable of providing input regarding the product design, the network being capable of allowing the input to be simultaneously viewed by each party as the input is being made so that input made by one party is capable of being accessed by at least one other party, the central processing unit comprises at least one of graphic user interface, computer-aided design tools, computer-aided engineering tools, and computer-aided manufacturing tools, wherein each party may make input to the product design using at least one of the graphic user interface computer-aided design tools, computer-aided engineering tools, and computer-aided manufacturing tools, and wherein each party that is connected to the central processing unit selectively blocks particular parties from accessing the input regarding the product design.

20. A network based product design system for product design, the system comprising:
- a central processing unit that is capable of product design, the central processing unit comprises an analytical tool to analyze and evaluate the effectiveness of the network based product design system and at least one of transfer functions and quality-related analysis tools to analyze and evaluate at least one of product design, and design and manufacture of tools and molds for plastic-formation processes, the manufacture of tools and molds comprising at least one of machining, electro-discharge machining, and welding, the central processing unit also comprising tools for evaluation and analysis of mold filing and mold cooling using computer-related steps, processes, analogies, and transfer functions, and the transfer functions comprises transfer functions that are at least one of originally provided in the network-based design system, created by the network-based design system, modified by the network-based design system, or combinations thereof;
- at least one communication link that allows selective two-way communication to the central processing unit in at least near real time, wherein the at least one communication link comprises at least one of phone modem, network connection, radio communication and other wireless communication systems, cellular communication, satellite communication, web access communication, and Internet access communication, and combinations thereof; and
- a network that selectively interconnects and communicates the central processing unit to at least one party through the at least one communication link, wherein each party that is connected to the central processing unit is capable of providing input regarding a product design, the network being capable of allowing the input to be simultaneously viewed by each party as the input is being made so that input made by one party is capable of being accessed by at least one other party, the central processing unit comprises at least one of graphic user interface, computer-aided design tools, computer-aided engineering tools, and computer-aided manufacturing tools, wherein each party may make input to the product design using at least one of the graphic user interface computer-aided design tools, and computer-aided manufacturing tools, and wherein each party that is connected to the central processing unit selectively blocks particular parties from accessing the input regarding the product design.

21. A method for designing a product over a network, the method being capable of product design, the method comprising:
- displaying a product model on a central processing unit capable of product design, the model being representative of the product that is to be designed and wherein the central processing unit comprises:
  - an analytical tool to analyze and evaluate the effectiveness of the method for designing a product over a network, said analytical tool including a design for six sigma process; and
  - an order placement tool to enter a request for a product including design criteria for the product, to receive bids for the product from a supplier or a manufacturer, to place an order for the product with said supplier or said manufacturer, and to schedule production of the product;
- permitting two-way communication to the central processing unit for designing the product over at least one communication link; and
- selectively interconnecting and communicating the product design through the central processing unit over the at least one communication link, wherein each party that is connected to the central processing unit is capable of providing input regarding the product design, the network being capable of allowing the input to be simultaneously viewed by each party as the input is being made so that input made by one party is capable of being accessed by at least one other party, and wherein each party that is connected to the central processing unit selectively blocks particular parties from accessing the input regarding the product design.

22. A method according to claim 21, wherein the step of selectively interconnecting and communicating comprises selectively interconnecting and communicating the central processing unit to at least one part in real time.

23. A method according to claim 21, wherein the step of selectively interconnecting and communicating comprises selectively interconnecting and communicating to at least one party in near real time.

24. A method according to claim 21, wherein the step of permitting two-way communication to the central processing unit over communication links comprises permitting two-way communication to the central processing unit over the Internet.

25. A method according to claim 21, wherein the step of permitting two-way communication to the central processing unit over communication links comprises permitting two-way communication to the central processing unit over communication links over at least one of phone moderm, network connection, radio communication and other wireless communication systems, cellular communication, satellite communication, web access communication, and Internet access communication, and combinations thereof.

26. A method according to claim 21, further comprising designing a product using computer-aided design tools capable of product design, wherein each party may make input to the product design using the computer-aided design tools.

27. A method according to claim 21, further comprising designing a product using at least one of computer-aided engineering tools and computer-aided manufacturing tools capable of product design, wherein each party may make input to the product design using the computer-aided manufacturing tools.

28. A method according to claim 21, further comprising designing a product using graphic user interface capable of product design, wherein each party may make input to the product design using graphic user interface.

29. A method according to claim 21, further comprising archiving input by the central processing unit, wherein each party may access archived input.

30. A method according to claim 21, further comprising analyzing and evaluating input for product design using transfer functions.

31. A method according to claim 21, further comprising the step of analyzing and evaluating input for product design using quality-related analysis tools.

32. A method for designing a product over a network, the method being capable of product design, the method comprising:
  displaying a product model on a central processing unit for designing products, the model being representative of the product that is to be designed and wherein the central processing unit comprises:
    an analytical tool to analyze and evaluate the effectiveness of the method for designing a product over a network, said analytical tool including a design for six sigma process; and
    an order placement tool to enter a request for a product including design criteria for the product, to receive bids for the product from a supplier or a manufacturer, to place an order for the product with said supplier or said manufacturer, and to schedule production of the product;
  permitting two-way communication to the central processing unit over communication links in at least near real time, wherein the at least one communication link comprises at least one of phone moderm, network connection, radio communication and other wireless communication systems, cellular communication, satellite communication, web access communication, and Internet access communication, and combinations thereof;
  selectively interconnecting and communicating the product design through the central processing unit over the at least one communication link;
  allowing the input to be simultaneously viewed by each party as the input is being made so that input made by one party is capable of being accessed by at least one other party; and
  analyzing and evaluating the product design using at least one of transfer functions end quality-related analysis tools, wherein each party that is connected to the central processing unit is capable of providing input regarding the product design, the network being capable of allowing the input to be simultaneously viewed by each party as the input is being made so that input made by one party is capable of being accessed by at least one other party, the central processing unit comprises at least one of graphic user interface, computer-aided design tools, and computer-aided manufacturing tools, wherein each party may make input to the product design using at least one of the graphic user interface computer-aided design tools, and computer-aided manufacturing tools, and wherein each party that is connected to the central processing unit selectively blocks particular parties from accessing the input regarding the product design.

33. A network based product design system for product design, the system comprising:
  network-based central processing means capable of product design, the central processing means comprising:
    an analytical tool to analyze and evaluate the effectiveness of the network based product design system including a design for six sigma process; and
    an order placement tool to enter a request for a product including design criteria for the product, to receive bids for the product from a supplier or a manufacturer, to place an order for the product with said supplier or said manufacturer, and to schedule production of the product;
  communication link means that allows selective two-way communication to the central processing means; and
  network means that selectively interconnects and communicates the central processing means to at least one party through the at least one communication link means, wherein each party that is connected to the central processing means is capable of providing input regarding the product design, the network means being capable of allowing the input to be simultaneously viewed by each party as the input is being made so that input made by one party is capable of being accessed by at least one other party, and wherein each party that is connected to the central processing unit selectively blocks particular parties from accessing the input regarding the product design.

34. A system according to claim 33, wherein the network means selectively interconnects and communicates the central processing means to at least one party in real time.

35. A system according to claim 33, wherein the network means selectively interconnects and communicates the central processing means to at least one party in near real time.

36. A system according to claim 33, wherein the communication link means comprises the Internet.

37. A system according to claim 33, wherein the communication link means comprises at least one of phone modem, network means connection, radio communication and other wireless communication systems, cellular communication, satellite communication, web access communication, and Internet access communication, and combinations thereof.

38. A system according to claim 33, wherein the central processing means further comprises at least one of computer-aided engineering tools and computer-aided design means for product design, wherein each party may make input to the product design using the computer-aided design means.

39. A system according to claim 33, wherein the central processing means further comprises computer-aided manufacturing means for product design, wherein each party may make input to the product design using the computer-aided manufacturing means.

40. A system according to claim 33, wherein the central processing means further comprises at least one of computer-aided design means, computer-aided engineering tools, and computer-aided manufacturing means for product design, wherein each party may make input to the product design using at least one of the computer-aided design means and computer-aided manufacturing means.

41. A system according to claim 33, wherein the central processing means further comprises graphic user interface means for product design, wherein each party may make input to the product design using the graphic user interface means.

42. A system according to claim 33, wherein the central processing means archives the input by each party, wherein each party may access archived input.

43. A system according to claim 33, wherein the central processing means further comprises transfer functions to analyze and evaluate the input with regard to the product design.

44. A system according to claim 33, wherein the central processing means comprises quality-related analysis tools to analyze and evaluate the product design.

45. A network means based product design system for product design, the system comprising:
- central processing means that is capable of product design, the central processing means comprises:
  - an analytical tool to analyze and evaluate the effectiveness of the network means based product design system including a design for six sigma process;
  - an order placement tool to enter a request for a product including design criteria for the product, to receive bids for the product from a supplier or a manufacturer, to place an order for the product with said supplier or said manufacturer, and to schedule production of the product; and
  - at least one of transfer functions and quality-related analysis tools to analyze and evaluate the product design;
- communication link means that allows selective two-way communication to the central processing means in at least near real time, wherein the at least one communication link means comprises at least one of phone modem, network means connection, radio communication and other wireless communication systems, cellular communication, satellite communication, web access communication, and Internet access communication, and combinations thereof; and
- network means that selectively interconnects and communicates the central processing means to at least one party through the communication link means, wherein each party that is connected to the central processing means is capable of providing input regarding the product design, the network means being capable of allowing the input to be simultaneously viewed by each party as the input is being made so that input made by one party is capable of being accessed by at least one other party, the central processing means comprises at least one of graphic user interface means, computer-aided engineering tools, computer-aided design means, and computer-aided manufacturing means, wherein each party may make input to the product design using at least one of the graphic user interface means, computer-aided design means, and computer-aided manufacturing means, and wherein each party that is connected to the central processing unit selectively blocks particular parties from accessing the input regarding the product design.

46. A network based product design system for product design, the system comprising:
- a network-based central processing unit capable of product design, the central processing unit comprising:
  - an analytical tool to analyze and evaluate the effectiveness of the network based product design system, wherein said analytical tool includes software to implement a method including:
    - examining a product design process performed by the network based product design system for one or more detects, wherein each said defect is a component of the product design process that can be improved;
    - assigning a sigma value to said product design process in response to the number of said defects, wherein said sigma value indicates how well said product design process is performing; and
    - modifying said product design process in response to said sigma value reaching a pre-selected threshold; and
  - an order placement tool to enter a request for a product including design criteria for the product, to receive bids for the product from a supplier or a manufacturer, to place an order for the product with said supplier or said manufacturer, and to schedule production of the product;
- at least one communication link that allows selective two-way communication to the central processing unit; and
- a network that selectively interconnects and communicates the central processing unit to at least one party through the at least one communication link, wherein each party that is connected to the central processing unit is capable of providing input regarding the product design including information concerning design and manufacture of tools and molds for use in manufacturing said product using a plastic formation process, the network being capable of allowing the input to be simultaneously viewed by each party as the input is being made so that input made by one party is capable of being accessed by at least one other party, and wherein each party that is connected to the central processing unit selectively blocks particular parties from accessing the input regarding the product design.

* * * * *